US012757010B2

(12) United States Patent
Hidaka

(10) Patent No.: US 12,757,010 B2
(45) Date of Patent: Oct. 6, 2026

(54) RADIO WAVE GENERATION DEVICE, ADDRESS ASSOCIATION METHOD, AND RECORDING MEDIUM

(71) Applicant: NEC Corporation, Tokyo (JP)

(72) Inventor: Takeo Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 18/281,739

(22) PCT Filed: Jan. 25, 2022

(86) PCT No.: PCT/JP2022/002652
§ 371 (c)(1),
(2) Date: Sep. 12, 2023

(87) PCT Pub. No.: WO2022/196113
PCT Pub. Date: Sep. 22, 2022

(65) Prior Publication Data

US 2024/0155333 A1 May 9, 2024

(30) Foreign Application Priority Data

Mar. 16, 2021 (JP) ................................ 2021-042797

(51) Int. Cl.
*H04W 8/26* (2009.01)
*H04W 4/021* (2018.01)

(52) U.S. Cl.
CPC ............ *H04W 8/26* (2013.01); *H04W 4/021* (2013.01)

(58) Field of Classification Search
CPC ......... H04W 8/26; H04W 4/021; H04W 4/33; Y02D 30/70
See application file for complete search history.

(56) References Cited

U.S. PATENT DOCUMENTS

2004/0187030 A1* 9/2004 Edney ..................... H04L 61/10 726/13
2010/0088416 A1* 4/2010 Kurita ................ H04L 63/0815 709/227
2017/0330240 A1* 11/2017 Fonzi .................... H04W 4/029

FOREIGN PATENT DOCUMENTS

JP 2007-317027 A 12/2007
JP 2008-294502 A 12/2008
(Continued)

OTHER PUBLICATIONS

JP Official Communication for JP Application No. 2023-506821, mailed on Apr. 22, 2025 with English Translation.
(Continued)

*Primary Examiner* — Marcos L Torres
(74) *Attorney, Agent, or Firm* — Sughrue Mion, PLLC

(57) ABSTRACT

A radio wave generation device transmits and receives packets by radio waves. The radio wave generation device determines, based on sensor data acquired from a server, whether a wireless terminal has newly entered a floor subject to position determination. When it is determined that the wireless terminal has newly entered the floor subject to position determination, the radio wave generation device performs association of a MAC address of a floor entry terminal with an IP address, the floor entry terminal being the wireless terminal determined to have newly entered the floor subject to position determination. The radio wave generation device performs the association by transmitting a packet requesting a response from the floor entry terminal.

3 Claims, 7 Drawing Sheets

(56) References Cited

FOREIGN PATENT DOCUMENTS

| | | | |
|---|---|---|---|
| JP | 2009-088918 | A | 4/2009 |
| JP | 2014-007708 | A | 1/2014 |
| JP | 2017-152791 | A | 8/2017 |
| JP | 2018-023027 | A | 2/2018 |

OTHER PUBLICATIONS

International Search Report for PCT Application No. PCT/JP2022/002652, mailed on May 10, 2022.

* cited by examiner

RADIO WAVE GENERATION DEVICE, ADDRESS ASSOCIATION METHOD, AND RECORDING MEDIUM

This application is a National Stage Entry of PCT/JP2022/002652 filed on Jan. 25, 2022, which claims priority from Japanese Patent Application 2021-042797 filed on Mar. 16, 2021, the contents of all of which are incorporated herein by reference, in their entirety.

TECHNICAL FIELD

The present invention relates to a radio wave generation device, an address association method, and a recording medium.

BACKGROUND ART

Patent Document 1 discloses a technique in which a wireless terminal receives location information from a communication device installed in a fixed position, such as the ceiling of a room, and transmits information including, for example, a MAC address, along with the received location information, to the communication device.

Patent Document 2 discloses a technique whereby a wireless LAN access point, upon receiving an ARP request packet, determines whether or not a relevant wireless terminal (the wireless terminal whose IP address is the destination of that ARP request packet) exists among the wireless terminals currently connected to the device, and if so, creates an ARP response packet for the relevant wireless terminal and sends the ARP response packet.

PRIOR ART DOCUMENTS

Patent Documents

Patent Document 1: Japanese Unexamined Patent Application, First Publication No. 2014-007708

Patent Document 2: Japanese Unexamined Patent Application, First Publication No. 2009-088918

SUMMARY OF THE INVENTION

Problems to be Solved by the Invention

However, the techniques disclosed in Patent Documents 1 and 2 have the problem that they cannot easily and suitably obtain information on wireless terminals that have newly entered an area subject to position determination.

An example object of this invention is to provide a radio wave generation device, an address association method, and a recording medium that solve the aforementioned problems.

Means for Solving the Problem

A radio wave generation device according to a first example aspect of the present invention includes: a packet transmission and reception means that transmits and receives packets by radio waves; a floor entry determination means that determines, based on sensor data acquired from a server, whether a wireless terminal has newly entered a floor subject to position determination; and an address association means that, when the floor entry determination means has determined that the wireless terminal has newly entered the floor subject to position determination, performs association of a MAC address of a floor entry terminal with an IP address, the floor entry terminal being the wireless terminal determined to have newly entered the floor subject to position determination. The address association means performs the association by causing the packet transmission and reception means to transmit a packet requesting a response from the floor entry terminal.

A radio wave generation device according to a second example aspect of the present invention includes: a packet transmission and reception means that transmits and receives packets by radio waves; a setting information acquisition means that acquires setting information from a server; a position determination terminal table generation means that generates a position determination terminal table for a wireless terminal subject to position determination based on the setting information; a sensor data acquisition means that acquires sensor data from the server; a floor entry determination means that determines whether or not a wireless terminal has newly entered a floor subject to position determination based on the sensor data; and an address association means that, when the floor entry determination means has determined that the wireless terminal has newly entered the floor subject to position determination, performs association of MAC address of a floor entry terminal with an IP address, the floor entry terminal being the wireless terminal determined to have newly entered the floor subject to position determination. The address association means performs the association by causing the packet transmission and reception means to transmit a packet requesting a response from the floor entry terminal. The position determination terminal table generation means updates the position determination terminal table so that the floor entry terminal for which the association has been performed by the address association means becomes the wireless terminal subject to the position determination.

An address association method according to a third example aspect of the present invention includes: transmitting and receiving packets by radio waves; determining whether or not a wireless terminal has newly entered a floor subject to position determination based on sensor data acquired from a server; and when it is determined that the wireless terminal has newly entered the floor subject to position determination, performing association of a MAC address of a floor entry terminal with an IP address, the floor entry terminal being the wireless terminal determined to have newly entered the floor subject to position determination. A packet requesting a response from the floor entry terminal is transmitted when the association is performed.

A recording medium according to a fourth example aspect of the present invention records a program that causes a computer of a radio wave generation device to function as: a packet transmission and reception means that transmits and receives packets by radio waves; a floor entry determination means that determines, based on sensor data acquired from a server, whether a wireless terminal has newly entered a floor subject to position determination; and an address association means that, when the floor entry determination means has determined that the wireless terminal has newly entered the floor subject to position determination, performs association of a MAC address of a floor entry terminal with an IP address, the floor entry terminal being the wireless terminal determined to have newly entered the floor subject to position determination, and the address association means performs the association by causing the packet transmission and reception means to transmit a packet requesting a response from the floor entry terminal.

Effect of Invention

According to the example embodiment of the present invention, it is possible to easily and suitably acquire information on wireless terminals that have newly entered an area subject to position determination.

EXAMPLE EMBODIMENT

Figure 1:
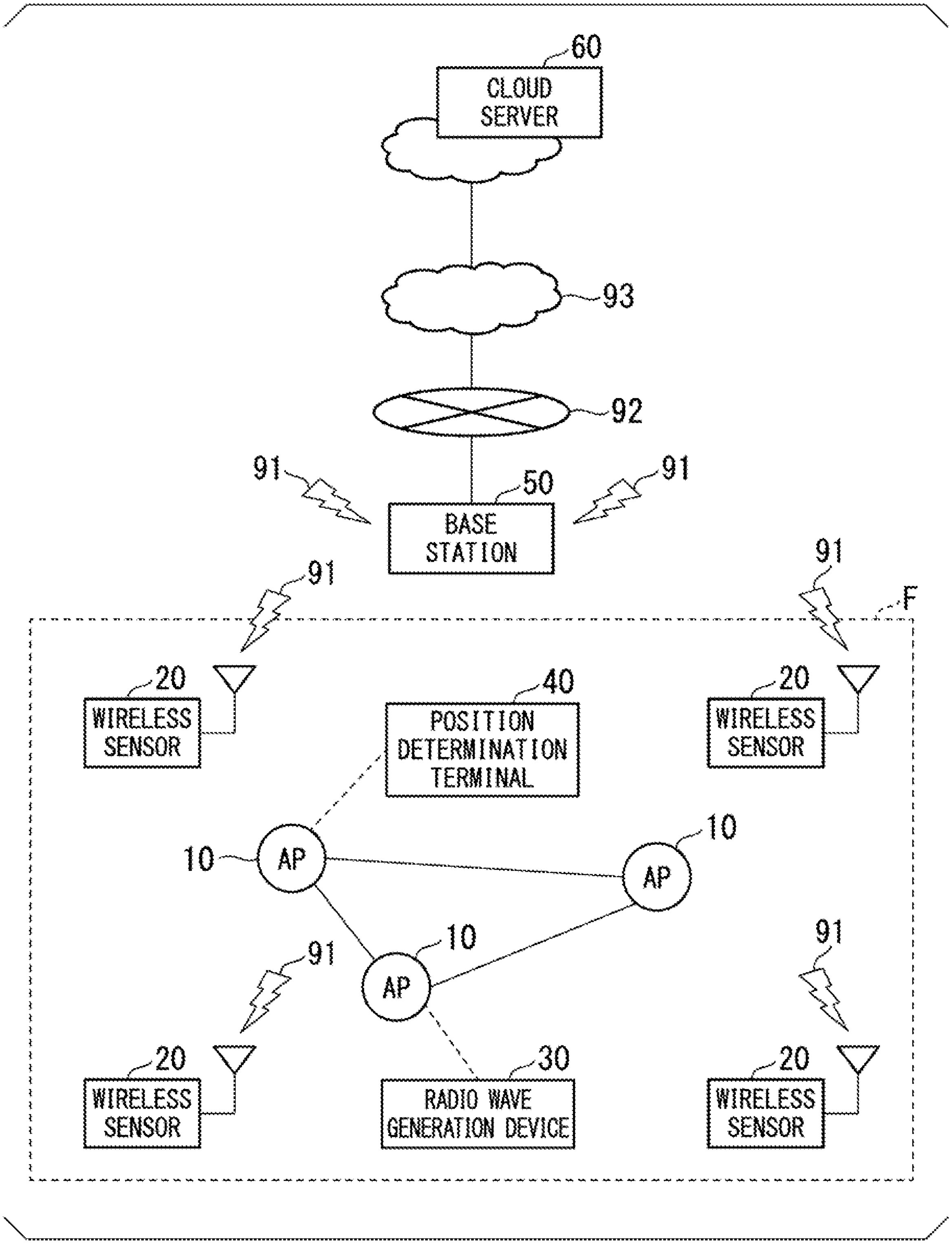
FIG. 1 is a drawing that illustrates an example configuration of a wireless position determination system.

FIG. 1 is a drawing that illustrates an example configuration of a wireless position determination system 1 according to the present example embodiment. The wireless position determination system 1 includes a wireless LAN access point (hereinbelow referred to as "AP") 10, a wireless sensor 20, and a radio wave generation device 30. The AP 10, wireless sensor 20, and radio wave generation device 30 are installed on floor F. The floor F is the area indicated by the dashed line in FIG. 1 and may also be referred to as a floor subject to position determination or an area subject to position determination. FIG. 1 also illustrates a position determination terminal 40 that is present in floor F.

The position determination terminal 40 is a terminal (e.g., a wireless LAN terminal such as a smartphone, tablet terminal, or laptop PC) that is subject to position determination by the wireless position determination system 1. The position determination terminal 40 present in the floor F is connected to the AP 10 by wireless LAN (shown by the dashed line in the figure).

One or more APs 10 are installed on the floor F. The AP 10 is connected by wireless LAN to the radio wave generation device 30 and the position determination terminal 40 present in the floor F (shown by the dashed line in the figure).

A plurality of the wireless sensors 20 are installed on the floor F. Each wireless sensor 20 performs bidirectional communication with a base station 50 via an LTE (registered trademark) (Long Term Evolution) mobile communication network 91. The wireless sensor 20 receives radio waves emitted by the position determination terminal 40 in the floor F and transmits them to a cloud server 60 as information about the position determination terminal 40 in the floor F (e.g., information including the MAC address of the position determination terminal 40). In addition to the above, the wireless sensor 20 also receives (senses) radio waves in the floor F (e.g., radio waves emitted by the position determination terminal 40 that has newly entered the floor F) and transmits the radio waves as sensor data to the cloud server 60. The sensor data includes, for example, a sensor identifier, measurement channel information, measurement start time, measurement end time, MAC address for each position determination terminal 40, and the radio wave strength of each MAC address (for each position determination terminal 40).

The base station 50 performs two-way communication with the cloud server 60 via a core network (mobile network) 92 and an Internet network 93.

The cloud server 60 stores various types of information. For example, the cloud server 60 receives information about the position determination terminal 40 in the floor F transmitted by the wireless sensor 20 and stores that information as setting information about the position determination terminal 40 in the floor F (including the MAC address of the position determination terminal 40). The cloud server 60 also receives and stores sensor data transmitted by the wireless sensor 20. The sensor data includes, for example, a sensor identifier, measurement channel information, measurement start time, measurement end time, MAC address for each position determination terminal 40, and the radio wave strength of each MAC address (for each position determination terminal 40).

One or more of the radio wave generation devices 30 are installed in the floor F (one is shown in the figure). The radio wave generation device 30 connects to the AP via wireless LAN (indicated by a dashed line in the figure). The radio wave generation device 30 may be a personal computer, for example. The radio wave generation device 30 and the position determination terminal 40 located on the floor F belong to the same wireless LAN subnet.

In the present example embodiment, LTE lines is supposed to be used to send and receive information between the wireless sensor 20 and the cloud server 60. Thus, for example, the base station 50 is an LTE base station.

The radio wave generation device 30 causes the position determination terminal to emit radio waves. In general, it is necessary for the position determination terminal 40 to emit radio waves in order to locate the position of the position determination terminal 40. The radio wave generation device 30 transmits a packet to the position determination terminal 40 targeted for position determination, and causes the position determination terminal 40 that received the packet to emit radio waves in response to that packet.

Specifically, the radio wave generation device 30 generates a position determination terminal table and sends packets to the radio wave generation device 30 based on the generated position determination terminal table. The position determination terminal table is a table of position determination terminals 40 targeted for position determination, being a table that stores the MAC address, IP address, and transmission timing (timing based on a predetermined period) of each of the position determination terminals 40 targeted for position determination. The ARP (Address Resolution Protocol) table also stores pairs of MAC addresses and IP addresses for each position determination terminal 40. While the ARP table is generated, so to speak, automatically (necessarily) in the process of communication, the position determination terminal table is generated separately and intentionally as a target of position determination.

Figure 2:
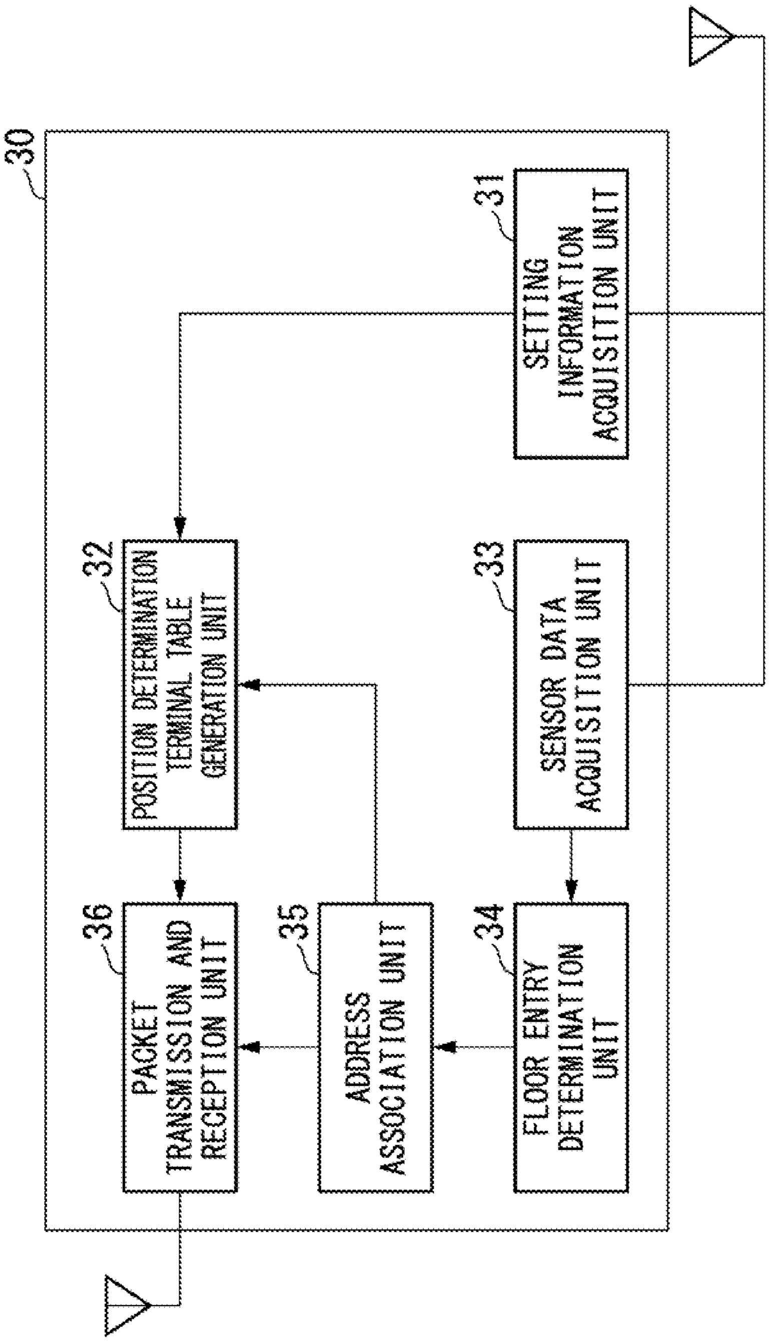
FIG. 2 is an example configuration of a radio wave generation device.

FIG. 2 shows an example of the radio wave generation device 30. The radio wave generation device 30 includes a setting information acquisition unit 31, a position determination terminal table generation unit 32, a sensor data acquisition unit 33, a floor entry determination unit 34, an address association unit 35, and a packet transmission and reception unit 36.

The setting information acquisition unit 31 acquires setting information (the MAC address of the position determination terminal 40) stored (saved) in the cloud server 60 via the LTE line.

The position determination terminal table generation unit 32 generates a table (position determination terminal table) for position determination terminals 40 targeted for position determination. Specifically, the position determination terminal table generation unit 32 generates a position determination terminal table by referring to the setting information obtained by the setting information acquisition unit 31 or by referring to the setting information obtained by the setting information acquisition unit 31 and the ARP table.

When the information (MAC address, IP address) of the position determination terminal 40 that has newly entered the floor F (hereinbelow sometimes referred to as a "floor entry terminal 40") has been reflected in the ARP table, the position determination terminal table generation unit 32 updates the position determination terminal table generated based on the setting information and the like acquired by the setting information acquisition unit 31. In other words, the position determination terminal table generated with reference to the setting information does not reflect the information of the floor entry terminal 40 captured by sensing. Therefore, when the floor entry terminal 40 is captured by sensing, the position determination terminal table generation unit 32 causes the information of the floor entry terminal 40 to be reflected in the position determination terminal table.

The sensor data acquisition unit 33 acquires sensor data stored in the cloud server 60 via the LTE line.

The floor entry determination unit 34 determines whether or not the position determination terminal 40 has newly entered the floor F by referring to the sensor data acquired by the sensor data acquisition unit 33. In other words, the floor entry determination unit 34 determines whether or not the floor entry terminal 40 is present. Specifically, the floor entry determination unit 34 compares the sensor data with the ARP table to determine whether or not the position determination terminal 40 has newly entered the floor F. In other words, the floor entry determination unit 34 determines that a position determination terminal 40 has newly entered the floor F if at least one MAC address in the sensor data is a MAC address that is not present in the ARP table.

The address association unit 35, upon determining that the position determination terminal 40 has newly entered the floor F (upon determining that floor entry terminal 40 exists), performs address association (association of MAC address to IP address) for the position determination terminal 40 that is determined to have newly entered the floor F. Specifically, the address association unit 35 causes the packet transmission and reception unit 36 to unicast ARP request packets and reflect the information of the floor entry terminal 40 in the ARP table.

The packet transmission and reception unit 36 transmits response request packets (e.g., ARP request packets, ICMP (Internet Control Message Protocol) echo request packets (Ping commands)).

Figure 3:
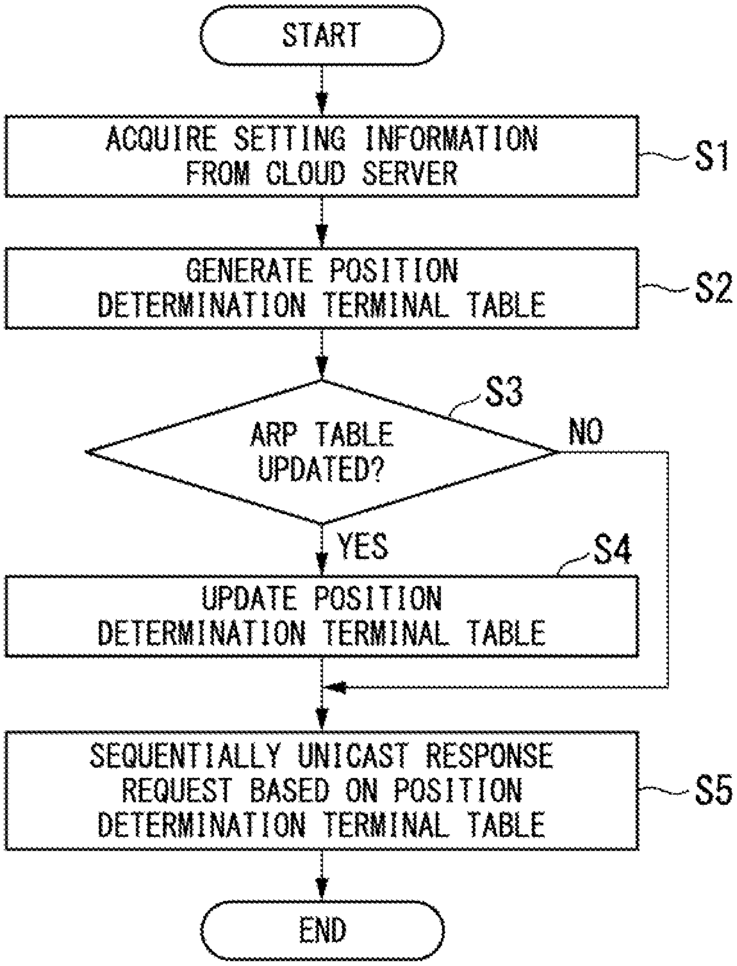
FIG. 3 is a flowchart illustrating an example of the operation of a radio wave generation device.
Figure 4A:
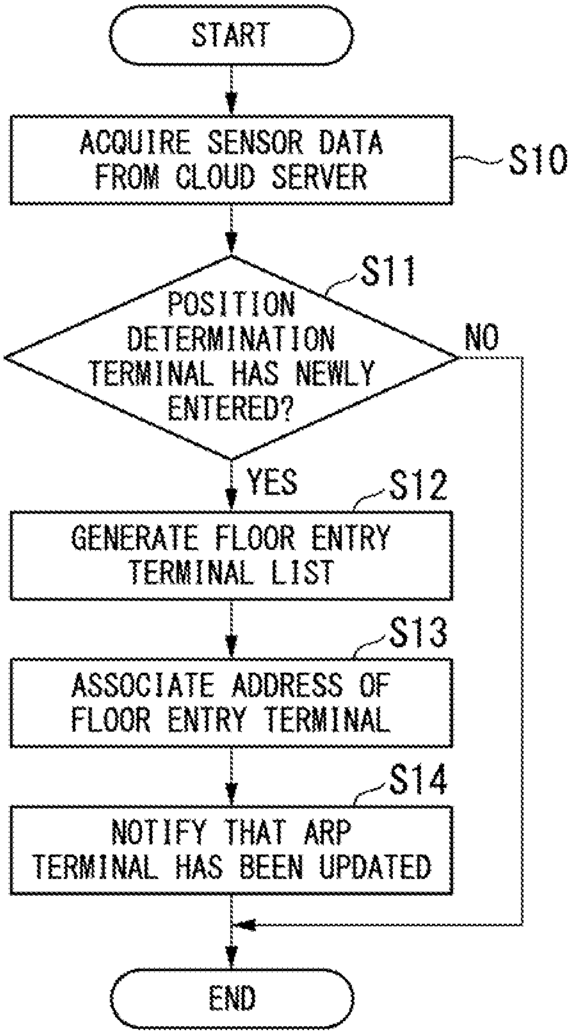
FIG. 4A is a flowchart illustrating an example of the operation of a radio wave generation device.
Figure 4B:
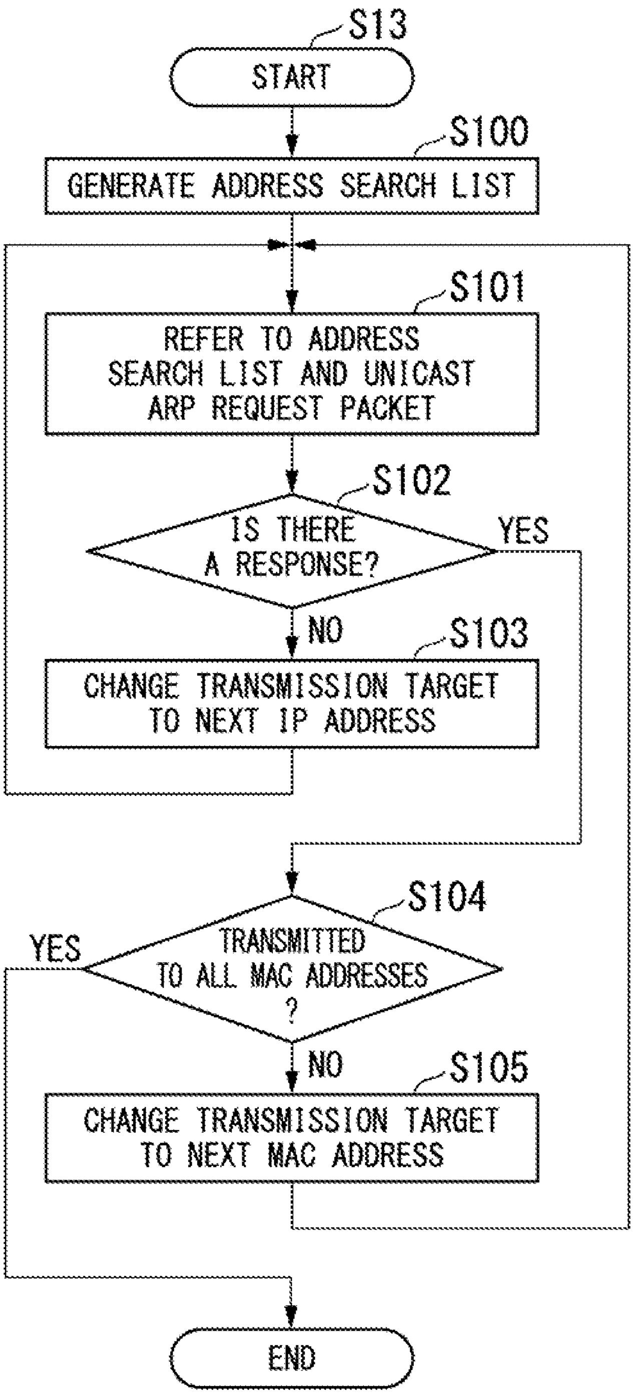
FIG. 4B is a flowchart illustrating an example of the operation of a radio wave generation device.
Figure 5:
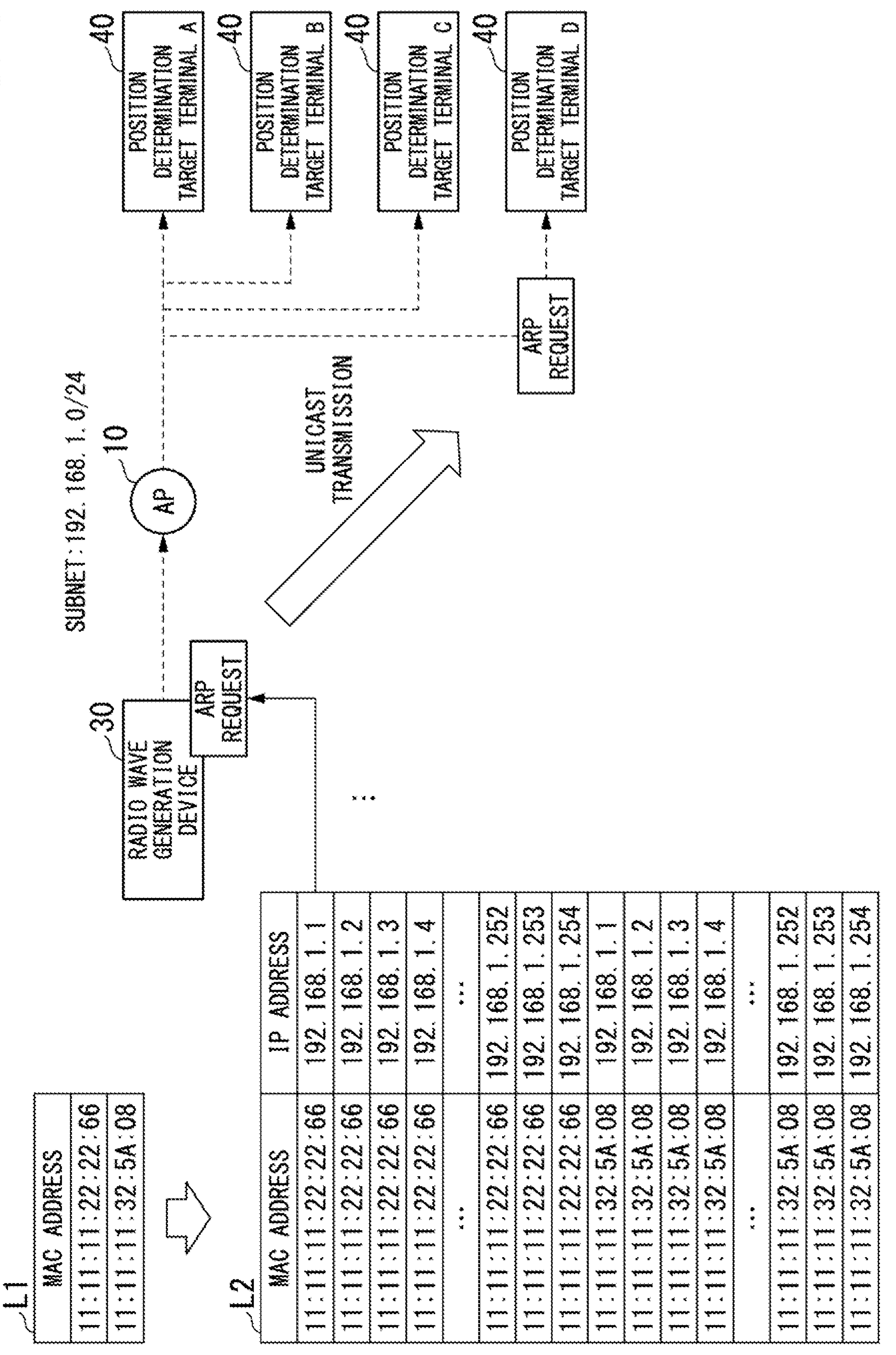
FIG. 5 is a conceptual diagram explaining how addresses are handled by the radio wave generation device.

Next, an example of the operation of the radio wave generation device 30 is described with reference to FIG. 3 through FIG. 5. FIG. 3 through FIG. 4B are flowcharts illustrating examples of the operation of the radio wave generation device 30. FIG. 5 is a conceptual diagram illustrating the address association method by the radio wave generation device 30. The radio wave generation device 30 performs the operations shown in the flowchart in FIG. 3 and the operations shown in the flowchart in FIG. 4A in parallel (e.g., multitasking by timer interrupt). The flowchart in FIG. 4B details the process of Step S13 of the flowchart in FIG. 4A.

(Flowchart of FIG. 3)

(Step S1) The setting information acquisition unit 31 acquires the setting information (MAC address of the position determination terminal 40) stored in the cloud server 60. The process then proceeds to Step S2.

(Step S2) The position determination terminal table generation unit 32 generates a position determination terminal table based on the setting information, etc. acquired by the setting information acquisition unit 31. The process then proceeds to Step S3.

(Step S3) The position determination terminal table generation unit 32 determines whether or not the ARP table has been updated. As an example, the position determination terminal table generation unit 32 determines that the ARP table has been updated upon being notified by the address association unit 35 (e.g., a notification that the ARP table has been updated). If the ARP table is updated (Step S3: YES), the process proceeds to Step S4. If the ARP table has not been updated (Step S3: NO), the process proceeds to Step S5.

(Step S4) The position determination terminal table generation unit 32 updates the position determination terminal table. Specifically, the position determination terminal table generation unit 32 refers to the updated ARP table and adds (reflects) the information of the floor entry terminal 40 to the position determination terminal table. The process then proceeds to Step S5.

(Step S5) The packet transmission and reception unit 36, referring to the position determination terminal table, sequentially unicasts a response request packet to the position determination terminal 40 targeted for position determination. For example, the packet transmission and reception unit 36 may unicast an ARP request packet or may transmit an ICMP echo request. The flowchart in FIG. 5 then ends. Upon completion, processing resumes from Step S1.

(Flowchart in FIG. 4A)

(Step S10) The sensor data acquisition unit 33 acquires sensor data stored in the cloud server 60. For example, the sensor data acquisition unit 33 may acquire sensor data for a time width corresponding to the period of the timer interrupt. The process then proceeds to Step S11.

(Step S11) The floor entry determination unit 34 determines whether or not the position determination terminal 40 has newly entered the floor F by referring to the sensor data acquired by the sensor data acquisition unit 33. If at least one MAC address in the sensor data is a MAC address that is not in the ARP table, the floor entry determination unit 34 determines that the position determination terminal 40 has newly entered the floor F. If the position determination terminal 40 has newly entered floor F (Step S11: YES), the process proceeds to Step S12. If no new position determination terminal 40 has entered the floor F (Step S11: NO), the flowchart in FIG. 4A ends. Upon completion, processing resumes from Step S10.

(Step S12) The floor entry determination unit 34 generates a list of MAC addresses of the position determination terminals 40 that have newly entered the floor F (floor entry terminals 40) (hereinbelow sometimes referred to as the floor entry terminal list). Specifically, the floor entry determination unit 34 extracts the MAC addresses in the sensor data that are not in the ARP table and generates a floor entry terminal list that includes the extracted MAC addresses. Then process then proceeds to Step S13.

(Step S13) The address association unit 35 associates the MAC address of the floor entry terminal 40 to the IP address (causes the information of the floor entry terminal 40 to be reflected in the ARP table). The process then proceeds to Step S14. The details of Step S13 are explained in the flowchart in FIG. 4B and the conceptual diagram in FIG. 5. FIG. 5 shows a plurality of position determination terminal devices 40, i.e., position determination terminal devices A to D.

(Step S14) The address association unit 35 notifies the position determination terminal table generation unit 32 (e.g., provides notification that the ARP table has been updated). The flowchart in FIG. 4A then ends. Upon completion, processing resumes from Step S10.

(Flowchart of FIG. 4B)

(Step S100) The address association unit 35 generates a list for address search (hereinbelow sometimes referred to as an "address search list") based on the floor entry terminal list (list of MAC addresses of the floor entry terminals 40). The process then proceeds to Step S101.

(Step S101) The packet transmission and reception unit 36, referring to the address search list, unicasts an ARP request packet. Specifically, the packet transmission and reception unit 36 unicasts an ARP request packet to one MAC address (floor entry terminal 40) and one IP address pair on the address search list. The process then proceeds to Step S102.

(Step S102) The packet transmission and reception unit 36 determines whether or not a response has been received within a predetermined time. If a response is received (Step S102: YES), the process proceeds to Step S104. If no response is received (Step S102: NO), the process proceeds to Step S103. If a response is received (Step S102: YES), the information of that MAC address (floor entry terminal 40 of that MAC address) is reflected in the ARP table.

(Step S103) The packet transmission and reception unit 36 changes the transmission target to the next IP address. The process then returns to Step S101. In other words, in the process of Step S101 that returned from Step S103, the packet transmission and reception unit 36 unicasts an ARP request packet to the next IP address while maintaining the MAC address.

(Step S104) The packet transmission and reception unit 36 determines whether or not an ARP request packet has been unicast for all MAC addresses on the address search list (i.e., all floor entry terminals 40). When an ARP request packet has been unicast for all MAC addresses (Step S104: YES), the flowchart in FIG. 4B (i.e., the process in Step S13 of FIG. 4A) ends. If an ARP request packet has not been unicast for at least some MAC addresses (Step S104: NO), the process proceeds to Step S105.

(Step S105) The packet transmission and reception unit 36 changes the transmission target to the next MAC address. The process then returns to Step S101. In other words, in the process of Step S101 that returned from Step S105, the packet transmission and reception unit 36 changes the MAC address and unicasts an ARP request packet to one IP address.

The flowchart shown in FIG. 4B is explained with reference to FIG. 5. It is assumed that in Step S12 of FIG. 4A, the floor entry determination unit 34 generated the floor entry terminal list (reference numeral L1) as shown in FIG. 5. In other words, assume that there are two floor entry terminals 40, one with a MAC address of "11:11:11:22:22:66" and the other with a MAC address of "11:11:11:32:5A:08". The subnet to which the radio wave generation device 30 belongs is supposed to be "192.168.1.0/24".

In Step S100 of FIG. 4B, the address association unit 35 generates an address search list (reference numeral L2) based on the floor entry terminal list, as shown in FIG. 5. The address search list is a list that is referenced when unicasting ARP request packets.

In the case of a typical ARP request packet, since it is a broadcast transmission, a broadcast address is specified in the target (destination) MAC address field of the ARP request packet. However, since unicast transmission is used in the present example embodiment, the MAC address of the floor entry terminal 40 is specified in the target MAC address field of the ARP request packet. By using unicast transmission, communication does not occur for the position determination terminals 40 (position determination terminals 40-2 to 40-XX) other than the position determination terminal 40 with the specified MAC address (for example, 40-1), thus suppressing battery drain on the position determination terminal 40 with the specified MAC address. In other words, by using unicast transmission instead of broadcast transmission, the position determination terminals 40 that process ARP request packets transmitted by the radio wave generation device 30 are limited (restricted), and the battery drain of the position determination terminals 40 in the floor F is reduced.

The target (destination) IP address field of the ARP request packet specifies the respective IP address within the range of the subnet to which the radio wave generation device 30 belongs. In the example in FIG. 5, the subnet to which the radio wave generation device 30 belongs is "192.168.1.0/24", so 254 IP addresses from "192.168.1.1 to 192.168.1.254" are specified. In the address search list shown in FIG. 5, 254 IP addresses from "192.168.1.1 to 192.168.1.254" are associated with each of the two MAC addresses ("11:11:11:22:22:66" and "11:11:11:32:5A:08"). If an IP address already set in the ARP table is present in the address search list, that IP address may be excluded from the address search list.

The packet transmission and reception unit 36 refers to the first pair of one MAC address and IP address in the address search list (the pair consisting of "11:11:11:22:22:66" and "192.168.1.1"), and transmits (unicasts) an ARP request packet with "11:11:11:22:22:66" set in the target MAC address field and "192.168.1.1" set in the target IP address field (Step S101).

If no response is received (Step S102: NO), the packet transmission and reception unit 36 refers to the pair consisting of the same MAC address and the next IP address (the pair consisting of "11:11:11:22:22:66" and "192.168.1.2"), and transmits (unicasts) an ARP request packet with "11:11:11:22:22:66" set in the target MAC address field and "192.168.1.2" set in the target IP address field (Step S103, Step S101). If no response is received this time (Step S102: NO), the packet transmission and reception unit 36 refers to the pair consisting of the same MAC address and the next IP address (the pair consisting of "11:11:11:22:22:66" and "192.168.1.3"), and transmits (unicasts) an ARP request packet with "11:11:11:22:22:66" set in the target MAC address field and "192.168.1.3" set in the target IP address field (Step S103, Step S101). Hereinbelow, the process of setting the next IP address (Step S103) and transmitting (unicasting) an ARP request packet (Step S101) is repeated until a response is received.

If no response is received for all pairs of "11:11:11:22:22:66" (the pairs of "11:11:11:22:22:66" and "192.168.1.1" to "11:11:11:22:22:66" and "192.168.1.254"), a retry (for example, retransmission for each pair) may be performed. Note that if there are other MAC address pairs on the address search list that have not yet responded, a retry may be made after transmission of the other MAC address pairs that have not yet responded.

If a response is received (Step S102: YES), the packet transmission and reception unit 36 stops transmitting ARP request packets with that MAC address "11:11:11:22:22:22:66", and determines whether or not ARP request packets have been unicast for all MAC addresses on the address search list (that is, all floor entry terminals 40) (Step S104).

In this example, since an ARP request packet has not been unicast for the MAC address "11:11:11:32:5A:08" (Step S104: NO), the packet transmission and reception unit 36 transmits (unicasts) an ARP request packet with "11:11:11:32:5A:08" set in the target MAC address field and "192.168.1.1" set in the target IP address field (Step S105, Step S101).

If no response is received (Step S102: NO), the packet transmission and reception unit 36 refers to the pair consisting of the same MAC address and the next IP address (the pair consisting of "11:11:11:32:5A:08" and "192.168.1.2"), and transmits (unicasts) an ARP request packet with "11:11:11:32:5A:08" set in the target MAC address field and "192.168.1.2" set in the target IP address field (Step S103, Step S101). If no response is received this time as well (Step S102: NO), the packet transmission and reception unit 36 refers to the pair consisting of the same MAC address and the next IP address (the pair consisting of "11:11:11:32:5A:08" and "192.168.1.3"), and transmits (unicasts) an ARP request packet with "11:11:11:32:5A:08" set in the target MAC address field and "192.168.1.3" set in the target IP address field (Step S103, Step S101). Hereinbelow, the process of setting the next IP address (Step S103) and transmitting (unicasting) an ARP request packet (Step S101) is repeated until a response is received.

If no response is received for all pairs of "11:11:11:32:5A:08" (the pairs of "11:11:11:32:5A:08" and "192.168.1.1" to "11:11:11:32:5A:08" and "192.168.1.254"), a retry (for example, retransmission for each pair) may be performed. If there are other MAC address pairs on the address search list that have not yet responded, a retry may be made after transmission of the other MAC address pairs that have not yet responded. If a response is received (Step S102: YES), the packet transmission and reception unit 36 stops transmitting ARP request packets with that MAC address "11:11:11:32:5A:08", and determines whether or not ARP request packets have been unicast for all MAC addresses on the address search list (that is, all floor entry terminals 40) (Step S104).

In this example, since the packet transmission and reception unit 36 has unicasted ARP request packets for all MAC addresses on the address search list (Step S104: YES), the flowchart in FIG. 4B ends.

As described above, the radio wave generation device 30 includes a packet transmission and reception unit 36 that transmits and receives packets by means of radio waves, a setting information acquisition means 31 that acquires setting information from a server, a position determination terminal table generation unit 32 that generates a position determination terminal table for the position determination terminal 40 based on the setting information, a sensor data acquisition unit 33 that acquires sensor data from the server, a floor entry determination unit 34 determines, on the basis of sensor data, whether a position determination terminal 40 has newly entered the floor F, and an address association unit 35 that, if the floor entry determination unit 34 has determined that a new position determination terminal 40 has entered the floor F, associates an IP address with the MAC address of the floor entry terminal 40 determined to have newly entered the floor F. The address association unit 35 performs the association by having the packet transmission and reception unit 36 transmit ARP request packets to be responded to by the floor entry terminal 40. The position determination terminal table generation unit updates the position determination terminal table so that the floor entry terminal 40 associated by the address association unit 35 becomes the position determination terminal 40 to be positioned.

More precisely, the radio wave generation device 30 generates a position determination terminal table for the position determination terminal 40 in the floor F using the setting information and other information (Step S2 in FIG. 3). Using the sensor data, the radio wave generation device 30 executes an address search for the floor entry terminals 40, if any, and reflects the information of the floor entry terminals 40 in the ARP table (Step S102 (YES) in FIG. 4B). If there are floor entry terminals 40, the radio wave generation device 30 adds (reflects) the information of the floor entry terminals 40 in the position determination terminal table using the ARP table that reflects the information of the floor entry terminals 40 (Step S4 in FIG. 3). The radio wave generation device 30 transmits a packet to the position determination terminal 40 based on the position determination terminal table (Step S5 in FIG. 3) in order to determine the position and causes the position determination terminal 40 to emit radio waves.

In other words, only when the position determination terminal 40 has entered the position determination target area (floor F), the radio wave generation device 30 performs an address search targeting that position determination terminal 40 (floor entry terminal 40), and reflects the information of the floor entry terminal 40 in the position determination terminal table, thereby suitably adding the floor entry terminal 40 to the targets for position determination.

Thus, the information of the floor entry terminal 40 can be obtained easily (by using existing equipment and resources) and suitably (for example, by performing the address search only when there is a floor entry terminal 40, thereby reducing the load on the network in the floor F and the drain on the battery of the position determination terminal 40 in the floor F, and by performing unicast transmission, thereby reducing the drain on the battery of the position determination terminal 40 in the floor F). This also makes it possible to easily and suitably target floor entry terminals 40 for rapid position determination.

The above description of the example embodiments are merely an example, and the specific configuration is not limited to the example embodiments, but also includes designs and the like within the scope that does not depart from the gist of the invention.

For example, the above example embodiment describes an example in which the floor entry determination unit 34 generates the floor entry terminal list, but the address association unit 35 may generate the floor entry terminal list. In other words, described in the above example embodiment is an example in which the floor entry determination unit 34, upon determining that the floor entry terminal 40 exists, generates a floor entry terminal list, and the address association unit 35 generates an address search list based on the floor entry terminal list, but the example embodiment is not limited to such an example. For example, if the floor entry determination unit 34 has determined that the floor entry terminal 40 is present, the address association unit 35 may generate the floor entry terminal list and the address search list.

For example, the above example embodiment describes an example in which the address association unit 35 performs unicast transmission during address association (specifically, address search), but it is not limited to such an example. For example, the address association unit 35 may perform broadcast transmission during address association (specifically, address search). For example, if an ARP proxy exists in the backbone of AP 10, broadcast transmission is more efficient because the ARP proxy will return ARP response packets. If the DHCP server can be accessed to obtain the address information (MAC address and IP address correspondence information) of each floor entry terminal 40, the address information of the floor entry terminals 40 may be obtained from the DHCP server and the addresses may be associated without conducting an address search. The radio wave generation device 30 may access the DHCP server after capturing the floor entry terminals 40 (e.g., after generating the floor entry terminal list).

In the above example embodiment, an example of using the cloud server 60 was described, but an on-premises server may also be used.

In the above example embodiment, wireless LAN is described as the wireless system to be used for position determination, but the wireless system is not limited to wireless LAN. The wireless system to be used for position determination may be 5G, LTE, LPWA (Low Power Wide Area), Bluetooth (registered trademark), ZigBee (registered trademark), and the like.

In the above example embodiment, an example of using LTE as a means of collecting sensor data is described, but the means of collecting sensor data is not limited to LTE. For example, the means may be wired LAN, wireless LAN, LPWA, Bluetooth, or ZigBee.

Figure 6:
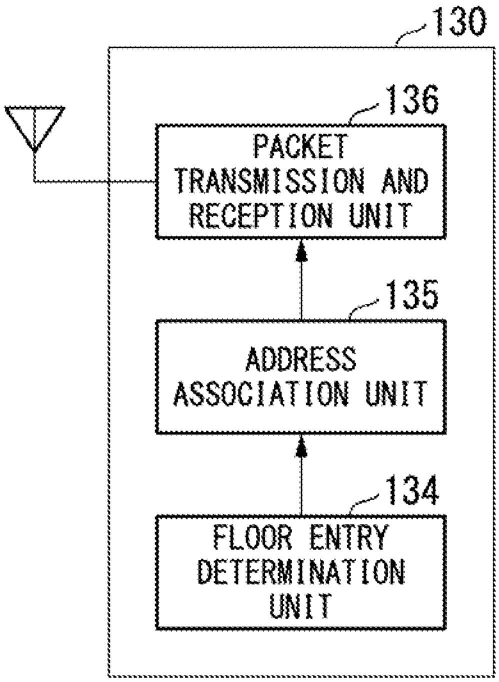
FIG. 6 is a functional block diagram of the configuration of the device according to the example embodiment.

FIG. 6 is a functional block diagram of the device configuration for the example embodiment of the invention. A radio wave generation device 130 shown in FIG. 6 has a floor entry determination unit 134, an address association unit 135, and a packet transmission and reception unit 136. The floor entry determination unit 134 of the radio wave generation device 130 has the same function as the floor entry determination unit 34 of the radio wave generation device 30. The address association unit 135 of the radio wave generation device 130 has the same function as the address association unit of the radio wave generation device 30. The response request packet transmission unit 136 of the radio wave generation device 130 has the same function as the packet transmission and reception unit 36 of the radio wave generation device 30.

In other words, the radio wave generation device 130 includes a packet transmission and reception unit 136 that transmits and receives packets by radio waves, a floor entry determination unit 134 that determines whether or not a position determination terminal 40 has newly entered the floor F based on sensor data acquired from the cloud server 60, and an address association unit 135 that, if the floor entry determination unit 134 has determined that the position determination terminal 40 has newly entered the floor F, associates an IP address with the MAC address of the floor entry terminal 40 that is determined to have newly entered the floor F. The address association unit 135 performs the association by having the packet transmission and reception unit 136 send ARP request packets to be responded to by the floor entry terminal 40.

The above-mentioned radio wave generation device 30 (as well as the radio wave generation device 130) has a computer system inside. Each of the above-mentioned processes is stored in a computer-readable recording medium in the form of a program, and the computer reads and executes this program to perform the above-mentioned processes. Here, a computer-readable recording medium refers to a magnetic disk, an optical disk, a CD-ROM, a DVD-ROM, a semiconductor memory, and the like. The computer program may also be delivered to a computer via a communication line, and the computer receiving this delivery may execute the program. The above program may also be used to realize some of the aforementioned functions. Furthermore, the above program may be a so-called differential file (differential program), which can realize the aforementioned functions in combination with a program already recorded in the computer system.

Priority is claimed on Japanese Patent Application No. 2021-042797, filed Mar. 16, 2021, the content of which is incorporated herein by reference.

INDUSTRIAL APPLICABILITY

The present disclosure may be applied to a radio wave generation device, an address association method, and a recording medium.

DESCRIPTION OF REFERENCE SYMBOLS

1 Wireless position determination system
10 Wireless LAN access point
20 Wireless sensor
30, 130 Radio wave generation device
31 Setting information acquisition unit
32 Position determination terminal table generation unit
33 Sensor data acquisition unit
34, 134 Floor entry determination unit
35, 135 Address association unit
36, 136 Packet transmission and reception
40 Position determination terminal
50 Base station
60 Cloud server
91 LTE mobile communication network
92 Core network (mobile network)
93 Internet network

What is claimed is:

1. A radio wave generation device comprising:

a memory configured to store instructions; and at least one processor configured to execute the instructions to:

transmit and receive packets by radio waves;

when at least one media access control (MAC) address included in sensor data acquired from a server is a MAC address that is not present in an address resolution protocol (ARP) table, determine that a wireless terminal has newly entered a floor subject to position determination;

when it is determined that the wireless terminal has newly entered the floor subject to position determination, perform association of a MAC address of a floor entry terminal with an internet protocol (IP) address, the floor entry terminal being the wireless terminal determined to have newly entered the floor subject to position determination;

perform the association by transmitting a packet requesting a response from the floor entry terminal;

unicast an ARP request packet requesting a response from the floor entry terminal;

generate a transmission destination list in which each of a plurality of IP addresses in a subnetwork in which the radio wave generation device belongs is associated with the MAC address of the floor entry terminal; and unicast an ARP request packet requesting a response from the floor entry terminal in a sequence based on the transmission destination list.

2. A radio wave generation device comprising:

a memory configured to store instructions; and at least one processor configured to execute the instructions to:

transmit and receive packets by radio waves;

acquire setting information from a server;

generate a position determination terminal table for a wireless terminal subject to position determination based on the setting information;

acquire sensor data from the server;

when at least one media access control (MAC) address included in the sensor data acquired from the server is a MAC address that is not present in an address resolution protocol (ARP) table, determine that a wireless terminal has newly entered a floor subject to position determination;

when it is determined that the wireless terminal has newly entered the floor subject to position determination, perform association of MAC address of a floor entry terminal with an internet protocol (IP) address, the floor entry terminal being the wireless terminal determined to have newly entered the floor subject to position determination, wherein perform the association by transmitting a packet requesting a response from the floor entry terminal, and update the position determination terminal table so that the floor entry terminal for which the association has been performed becomes the wireless terminal subject to the position determination;

unicast an ARP request packet requesting a response from the floor entry terminal;

generate a transmission destination list in which each of a plurality of IP addresses in a subnetwork in which the radio wave generation device belongs is associated with the MAC address of the floor entry terminal; and unicast an ARP request packet requesting a response from the floor entry terminal in a sequence based on the transmission destination list.

3. An address association method comprising:

transmitting and receiving packets by radio waves;

when at least one media access control (MAC) address included in sensor data acquired from a server is a MAC address that is not present in an address resolution protocol (ARP) table, determining that a wireless terminal has newly entered a floor subject to position determination; and when it is determined that the wireless terminal has newly entered the floor subject to position determination, performing association of a MAC address of a floor entry terminal with an internet protocol (IP) address, the floor entry terminal being the wireless terminal determined to have newly entered the floor subject to position determination, wherein a packet requesting a response from the floor entry terminal is transmitted when the association is performed, and wherein the method further comprises:

unicasting an ARP request packet requesting a response from the floor entry terminal;

generating a transmission destination list in which each of a plurality of IP addresses in a subnetwork in which a radio wave generation device belongs is associated with the MAC address of the floor entry terminal; and unicasting an ARP request packet requesting a response from the floor entry terminal in a sequence based on the transmission destination list.

* * * * *